(12) United States Patent
Choi et al.

(10) Patent No.: US 10,615,454 B2
(45) Date of Patent: Apr. 7, 2020

(54) ELECTROLYTE AND LITHIUM BATTERY INCLUDING THE ELECTROLYTE

(71) Applicant: SAMSUNG SDI CO., LTD., Yongin-si, Gyeonggi-do (KR)

(72) Inventors: Hyunbong Choi, Yongin-si (KR); Miyoung Son, Yongin-si (KR); Harim Lee, Yongin-si (KR); Woocheol Shin, Yongin-si (KR); Makhmut Khasanov, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 221 days.

(21) Appl. No.: 15/237,501

(22) Filed: Aug. 15, 2016

(65) Prior Publication Data

US 2017/0069935 A1   Mar. 9, 2017

(30) Foreign Application Priority Data

Sep. 4, 2015 (KR) ........................ 10-2015-0125609

(51) Int. Cl.
| | |
|---|---|
| *H01M 10/052* | (2010.01) |
| *H01M 10/0567* | (2010.01) |
| *H01M 10/0568* | (2010.01) |
| *H01M 10/0569* | (2010.01) |
| *H01M 10/0525* | (2010.01) |

(52) U.S. Cl.
CPC ..... *H01M 10/0567* (2013.01); *H01M 10/052* (2013.01); *H01M 10/0525* (2013.01); *H01M 10/0568* (2013.01); *H01M 10/0569* (2013.01); *H01M 2300/004* (2013.01); *H01M 2300/0025* (2013.01); *Y02T 10/7011* (2013.01)

(58) Field of Classification Search
CPC ........................ H01M 10/052; H01M 10/0525
See application file for complete search history.

(56) References Cited

U.S. PATENT DOCUMENTS

| | | | |
|---|---|---|---|
| 9,093,716 B2 | 7/2015 | Tokuda | |
| 2010/0015514 A1* | 1/2010 | Miyagi | ................. H01M 4/131 429/129 |

(Continued)

FOREIGN PATENT DOCUMENTS

| | | |
|---|---|---|
| EP | 2190054 A1 | 5/2010 |
| EP | 2618418 A1 | 7/2013 |

(Continued)

OTHER PUBLICATIONS

EPO Extended Search Report dated Feb. 8, 2017, for corresponding European Patent Application No. 16186488.9 (57 pages).

(Continued)

*Primary Examiner* — Olatunji A Godo
(74) *Attorney, Agent, or Firm* — Lewis Roca Rothgerber Christie LLP

(57) ABSTRACT

An electrolyte and a lithium battery including the electrolyte, a positive electrode, and a negative electrode are provided. The electrolyte includes a lithium difluorophosphate ($LiPO_2F_2$), a sultam-based compound, and an organic solvent. The electrolyte may reduce an internal resistance increase rate of a lithium battery, and thus improve high-temperature stability of the lithium battery.

11 Claims, 2 Drawing Sheets

(56) References Cited

U.S. PATENT DOCUMENTS

| | | | | |
|---|---|---|---|---|
| 2010/0209771 A1* | 8/2010 | Shizuka | ................. | B82Y 30/00 |
| | | | | 429/207 |
| 2013/0216919 A1* | 8/2013 | Tokuda | ............... | H01M 10/052 |
| | | | | 429/329 |
| 2016/0126592 A1 | 5/2016 | Saito et al. | | |

FOREIGN PATENT DOCUMENTS

| | | | |
|---|---|---|---|
| JP | 2007-172990 A | | 7/2007 |
| JP | 2007172990 | * | 7/2007 |
| JP | 2008-269979 A | | 11/2008 |
| JP | 2011-49153 A | | 3/2011 |
| WO | WO 2014/125946 A1 | | 8/2014 |

OTHER PUBLICATIONS

Xia, J. et al., Comparative Study on Methylene Methyl Disulfonate (MMDS) and 1,3-Propane Sultone (PS) as Electrolyte Additives for Li-Ion Batteries, Journal of the Electrochemical Society, 2014, pp. A547-A553, vol. 161, No. 4, The Electrochemical Society.

EPO Office Action dated Jun. 12, 2018, for corresponding European Patent Application No. 16186488.9 (5 pages).

* cited by examiner

ELECTROLYTE AND LITHIUM BATTERY INCLUDING THE ELECTROLYTE

CROSS-REFERENCE TO RELATED APPLICATION

This application claims priority to and the benefit of Korean Patent Application No. 10-2015-0125609, filed on Sep. 4, 2015, in the Korean Intellectual Property Office, the entire content of which is incorporated herein by reference.

BACKGROUND

1. Field

One or more exemplary embodiments relate to an electrolyte and a lithium battery including the electrolyte.

2. Description of the Related Art

With the advances in the field of small high-tech devices such as digital cameras, mobile devices, laptops, and personal computers, there has been a sharp increase in demand for lithium secondary batteries as energy sources. With the recent spread of electric vehicles (xEVs), including hybrid electric vehicles (HEVs), plug-in hybrid electric vehicles (PHEVs), and electric vehicles (EVs), there is a demand for lithium secondary batteries having high capacity, high energy density, and high power generation.

To implement high capacity, high energy density, and good output performance in a lithium secondary battery, an electrode of the lithium secondary battery may be formed as a high-density thick film. However, using such a high-density thick film as an electrode may lead to a reduced pore volume per unit volume of the electrode, an increased ionic path length, and, consequently, an increased resistance. Thus, there also is a need for improving insufficient ion conductivity.

A lithium secondary battery for electric vehicle or power storage is highly likely to be exposed to high-temperature external environments and a temperature rise due to instantaneous (or near instantaneous) charging and discharging. Exposure to such high-temperature environments may reduce battery lifetime and the amount of stored energy. Therefore, to be applicable in the field of electric vehicle, a lithium secondary battery should have good stability and cycle characteristics at high temperature.

SUMMARY

One or more aspects of exemplary embodiments are directed toward an electrolyte that may reduce an internal resistance increase rate of a lithium battery at high temperature (e.g., 60° C. or more) and may improve high-temperature (e.g., 60° C. or more) stability of the lithium battery.

One or more exemplary embodiments include a lithium battery including the electrolyte.

Additional aspects of embodiments will be set forth in part in the description which follows and, in part, will be apparent from the description, or may be learned by practice of the presented embodiments.

According to one or more exemplary embodiments, an electrolyte includes a lithium difluorophosphate (LiPO$_2$F$_2$), a sultam-based compound, and an organic solvent.

In some embodiments, the sultam-based compound may be a compound represented by Formula 1:

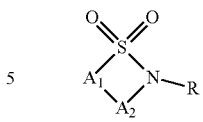

Formula 1 wherein, in Formula 1,
A$_1$ may be carbon, oxygen, or nitrogen;
A$_2$ may be a substituted or unsubstituted C1 to C10 alkylene group, or a substituted or unsubstituted C2 to C10 alkenylene group; and
R may be a substituted or unsubstituted C1 to C30 alkyl group, a substituted or unsubstituted C2 to C30 alkenyl group, or a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 aryl alkyl group, a substituted or unsubstituted C1 to C10 hetero alkyl group, a substituted or unsubstituted C2 to C30 heterocyclic group, or a substituted or unsubstituted C1 to C30 heteroaryl group.

According to one or more exemplary embodiments, a lithium battery includes: a positive electrode; a negative electrode; and at least one selected from the above-described electrolyte and a reaction product of the electrolyte disposed between the positive electrode and the negative electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
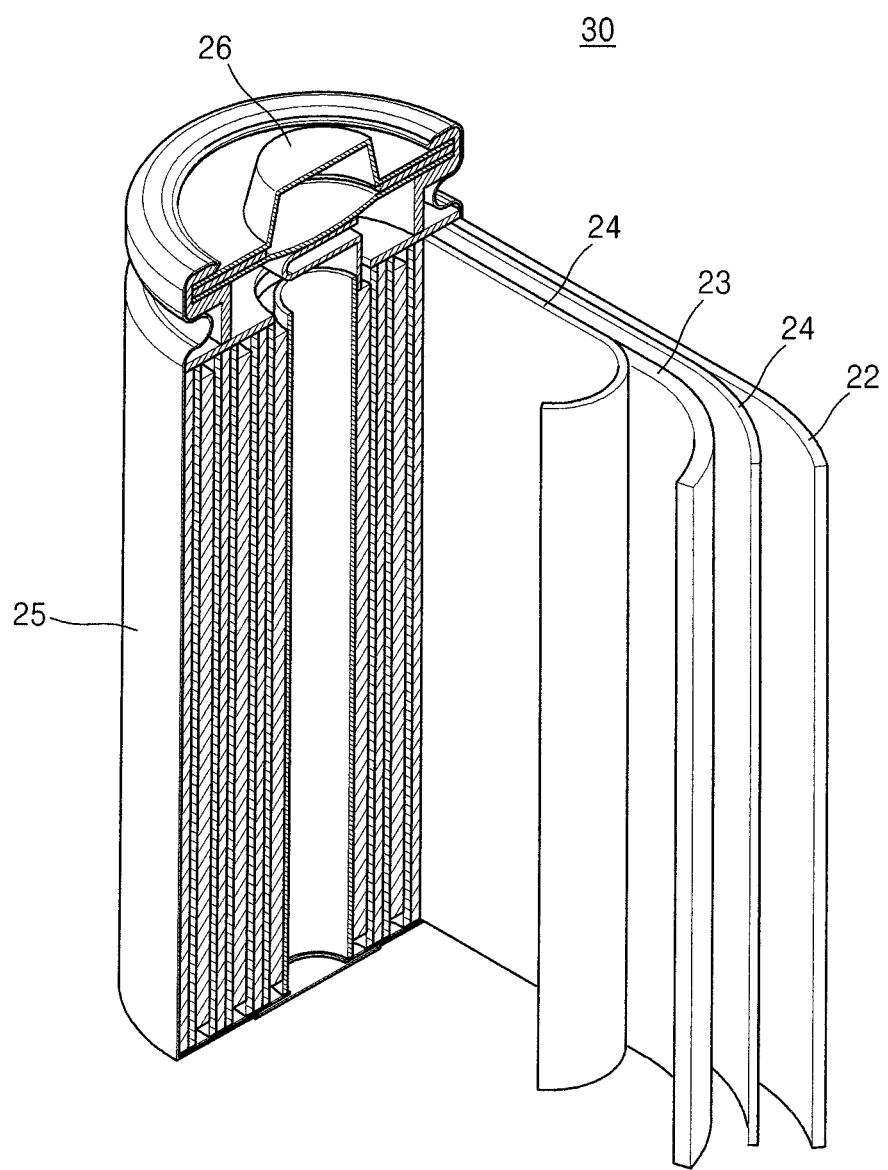
FIG. 1 is a schematic view illustrating a structure of a lithium battery according to an exemplary embodiment.

Reference will now be made in more detail to embodiments of an electrolyte and a lithium battery including the electrolyte, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list.

According to an aspect of an embodiment of the present disclosure, an electrolyte includes a lithium difluorophosphate (LiPO$_2$F$_2$), a sultam-based compound, and an organic solvent.

A combination of lithium difluorophosphate (LiPO$_2$F$_2$) and a sultam-based compound as additives used in the electrolyte may reduce an internal resistance increase rate of a lithium battery that provides medium or high power performance, when the lithium battery is stored at high-temperature (e.g., 60° C. or more). As used herein, the terms "combination thereof" and "combinations thereof" may refer to a chemical combination, a mixture, or a laminated structure of components.

Lithium difluorophosphate ($LiPO_2F_2$) may suppress or reduce a resistance increase in a positive electrode by being adsorbed onto the positive electrode. The sultam-based compound may form a thin film on a surface of the positive electrode to suppress or reduce decomposition of the electrolyte caused by contact between the electrolyte and a positive active material and a negative active material, and thus, improve high-temperature stability of the lithium battery and, consequently, suppress or reduce resistance increase in the lithium battery. Therefore, the combination of $LiPO_2F_2$ and a sultam-based compound may have a synergistic effect in suppressing or reducing total internal resistance increase in a lithium battery.

The combination of $LiPO_2F_2$ and a sultam-based compound may lead to rapid capacity stability and internal resistance (IR) drop even when continuous (e.g., substantially continuous) charging and discharging occurs. Accordingly, a lithium battery using a combination of $LiPO_2F_2$ and a sultam-based compound may have suppression or a reduction in resistance increase, and may have thermally stable characteristics, improved high-temperature characteristics, and improved power characteristics.

In some embodiments, the sultam-based compound may be a compound represented by Formula 1.

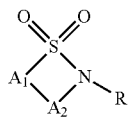

Formula 1

In Formula 1, $A_1$ may be carbon, oxygen, or nitrogen;

$A_2$ may be a substituted or unsubstituted C1 to C10 alkylene group, or a substituted or unsubstituted C2 to C10 alkenylene group; and R may be a substituted or unsubstituted C1 to C30 alkyl group, a substituted or unsubstituted C2 to C30 alkenyl group, or a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 aryl alkyl group, a substituted or unsubstituted C1 to C10 hetero alkyl group, a substituted or unsubstituted C2 to C30 heterocyclic group, or a substituted or unsubstituted C1 to C30 heteroaryl group (e.g., a C2 to C30 heteroaryl group).

For example, the sultam-based compound may include at least one selected from compounds represented by Formulae 2 to 6.

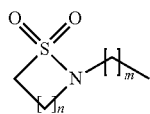

Formula 2

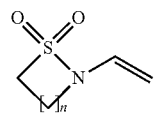

Formula 3

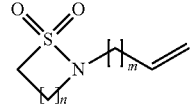

Formula 4

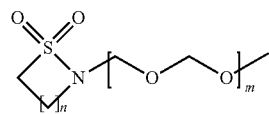

Formula 5

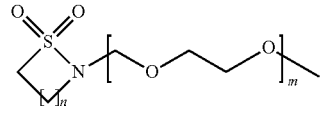

Formula 6

In Formulae 2 to 6, n may be from 1 to 4, and m may be from 1 to 10.

For example, the sultam-based compound may include at least one selected from the following compounds.

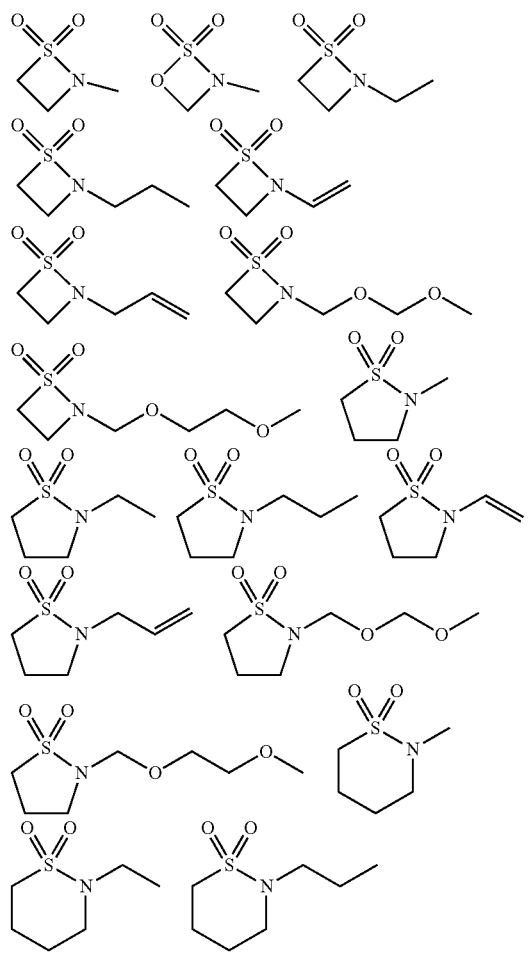

-continued

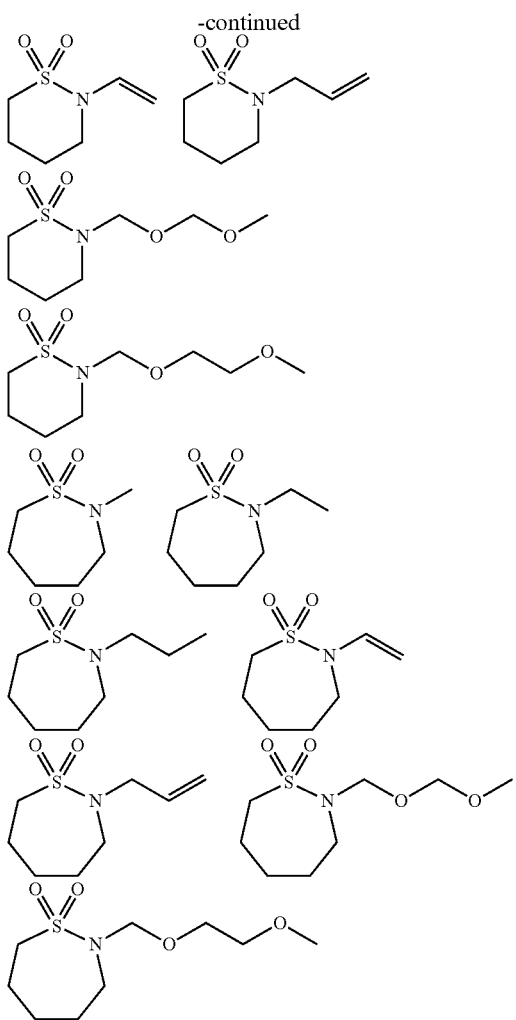

The amount of lithium difluorophosphate ($LiPO_2F_2$) may be from about 0.01 wt % to about 3 wt %, for example, from about 0.1 wt % to about 3 wt %, based on a total weight of the electrolyte. When the amount of lithium difluorophosphate ($LiPO_2F_2$) is within these ranges, the lithium difluorophosphate ($LiPO_2F_2$) in the electrolyte may suppress or reduce resistance increase in the positive electrode by being adsorbed onto the positive electrode, and, consequently, improve lifetime characteristics of a lithium battery at high temperature.

The amount of the sultam-based compound may be from about 0.01 wt % to 10 wt %, for example, from about 0.1 wt % to about 5 wt %, based on a total weight of the electrolyte. When the amount of the sultam-based compound is within these ranges, the sultam-based compound in the electrolyte may form a stable thin film on a surface of a negative electrode of a lithium battery, and thus, improve lifetime characteristics and output (power generation) characteristics of the lithium battery at high temperature (e.g., 60° C. or more).

The organic solvent used in the electrolyte may serve as a migration medium of ions involved in electrochemical reactions of the lithium battery. The organic solvent may be a nonaqueous organic solvent, for example, a carbonate solvent, an ester solvent, an ether solvent, a ketone solvent, an alcoholic solvent, an aprotic solvent, or a combination thereof.

The carbonate solvent may be a chain carbonate compound, a cyclic carbonate compound, a fluorocarbonate compound thereof, or a combination thereof.

Non-limiting examples of the chain carbonate compound include diethyl carbonate (DEC), dimethyl carbonate (DMC), dipropyl carbonate (DPC), methylpropyl carbonate (MPC), ethylpropylcarbonate (EPC), methylethyl carbonate (MEC), and a combination thereof. Non-limiting examples of the cyclic carbonate compound include ethylene carbonate (EC), propylenecarbonate (PC), butylene carbonate (BC), fluoroethylene carbonate (FEC), vinylethylene carbonate (VEC), and a combination thereof.

Non-limiting examples of the fluorocarbonate compound include fluoroethylene carbonate(FEC), 4,5-difluoroethylene carbonate, 4,4-difluoroethylene carbonate, 4,4,5-trifluoroethylene carbonate, 4,4,5,5-tetra fluoroethylene carbonate, 4-fluoro-5-methylethylene carbonate, 4-fluoro-4-methylethylene carbonate, 4,5-difluoro-4-methylethylene carbonate, 4,4,5-trifluoro-5-methylethylene carbonate, trifluoromethylethylene carbonate, and a combination thereof.

The carbonate solvent may include a combination of a cyclic carbonate compound and a chain carbonate compound. For example, when the amount of the cyclic carbonate compound is at least 20% by volume, and in some embodiments, about 30% by volume, and in some embodiments, about 40% by volume, based on a total volume of the nonaqueous organic solvent, cycle characteristics of a lithium battery may be markedly improved. The amount of the cyclic carbonate compound may be in a range of about 20% to about 70% by volume based on the total volume of the nonaqueous organic solvent.

The carbonate solvent may be a mixture of such chain carbonate and/or cyclic carbonate compounds as described above together with a fluorocarbonate compound. The fluorocarbonate compound may increase solubility of a lithium salt to improve ionic conductivity of the electrolyte, and may facilitate formation of the thin film on the negative electrode. In some embodiments, the fluorocarbonate compound may be fluoroethylene carbonate (FEC).

The amount of the fluorocarbonate compound may be from about 1% to about 30% by volume based on a total volume of the nonaqueous organic solvent. When the amount of the fluorocarbonate compound is within this range, the electrolyte may have an appropriate or suitable viscosity to provide desired or suitable effects thereof. In some embodiments, the nonaqueous organic solvent may further include vinylethylene carbonate (VEC) together with fluoroethylene carbonate (FEC). The amount of the VEC may be in a range of about 0.1% to about 10% by volume based on the total volume of the nonaqueous organic solvent.

Non-limiting examples of the ester solvent include methyl acetate, ethyl acetate, n-propyl acetate, dimethyl acetate, methyl propionate (MP), ethyl propionate, γ-butyrolactone, decanolide, valerolactone, mevalonolactone, caprolactone, and methyl formate. Non-limiting examples of the ether solvent include dibutyl ether, tetraglyme, diglyme, 1,2-dimethoxyethane, 1,2-diethoxyethane, ethoxymethoxyethane, 2-methyltetrahydrofuran, and tetrahydrofuran. An example of the ketone solvent is cyclohexanone. Non-limiting examples of the alcoholic solvent include ethyl alcohol and isopropyl alcohol.

Examples of the aprotic solvent include dimethyl sulfoxide, 1,2-dioxolane, sulfolane, methylsulfolane, 1,3-dimethyl-2-imidazolidinone, N-methyl-2-pyrrolidinone, formamide, dimethylformamide, acetonitrile, nitromethane, trimethyl phosphate, triethyl phosphate, trioctyl phosphate, and triester phosphate.

The organic solvent may be used alone or in a combination of at least two. In the latter, a mixing ratio of the at least two organic solvents may be appropriately or suitably adjusted depending on a desired or suitable performance of the lithium battery.

In some embodiments, the electrolyte for a lithium battery may further include a lithium salt.

The lithium salt may serve as a lithium ion source in a lithium battery to enable basic operation of the lithium battery. The lithium salt may be any suitable lithium salt that is available for use with lithium batteries. For example, the lithium salt may be at least one selected from LiCl, LiBr, LiI, LiClO$_4$, LiB$_{10}$Cl$_{10}$, LiPF$_6$, CF$_3$SO$_3$Li, CH$_3$SO$_3$Li, C$_4$F$_3$SO$_3$Li, (CF$_3$SO$_2$)$_2$NLi, LiN(C$_x$F$_{2x+1}$SO$_2$)(C$_y$F$_{2y+1}$SO$_2$) (wherein x and y are natural numbers), CF$_3$CO$_2$Li, LiAsF$_6$, LiSbF$_6$, LiAlCl$_4$, LiAlF$_4$, lithium chloroborate, lower aliphatic carboxylic acid lithium, lithium terphenylborate, and lithium imide.

The concentration of the lithium salt may be in a range of about 0.1M to about 5.0M, and in some embodiments, about 0.1M to about 2.0M to improve practical performance of the lithium battery. When the concentration of the lithium salt is within these ranges, the electrolyte may have improved performance with appropriate or suitable conductivity and appropriate or suitable viscosity, and may lead to effective migration of lithium ions.

In some embodiments, the electrolyte for a lithium battery may further include an additive to facilitate the formation of a stable solid electrolyte interphase (SEI) or a thin film on a surface of an electrode and, consequently, provide improved cycle characteristics.

Non-limiting examples of the additive include tris(trimethylsilyl)phosphate (TMSPa), lithium difluoro oxalate borate (LiFOB), vinylene carbonate (VC), propane sulfone (PS), succinonitrile (SN), LiBF$_4$, a silane compound having a functional group able to form a siloxane bond (for example, acryl, amino, epoxy, methoxy, ethoxy, or vinyl), and a silazane compound such as hexamethyldisilazane. These additives may be used alone or in a combination of at least two thereof.

The amount of the additive may be in a range of about 0.01 wt % to about 10 wt % based on a total weight of the nonaqueous organic solvent. For example, the amount of the additive may be from 0.05 wt % to about 10 wt %, in some embodiments, from about 0.1 wt % to about 5 wt %, and in some other embodiments, from about 0.5 wt % to about 4 wt %, based on the total weight of the nonaqueous organic solvent. However, the amount of the additive is not particularly limited unless the additive significantly hinders improvement in capacity retention rate of a lithium battery including the electrolyte.

In some embodiments, the electrolyte may be applied in a lithium battery operating at a medium or high voltage range of about 2.8 V to about 4.6 V to improve cell performance and stability of the lithium battery. For example, the electrolyte may be effectively applied in a high-voltage battery operating at a voltage range of about 4.3 V to about 4.6 V.

According to another aspect of the present disclosure, a lithium battery includes a positive electrode, a negative electrode, and an electrolyte disposed between the positive electrode and the negative electrode. The lithium battery may be manufactured using any suitable method available in the art.

FIG. 1 is a schematic view illustrating a structure of a lithium battery 30 according to an exemplary embodiment Referring to FIG. 1, the lithium battery 30 according to an exemplary embodiment includes a positive electrode 23, a negative electrode 22, and a separator 24 disposed between the positive electrode 23 and the negative electrode 22. The positive electrode 23, the separator 24, and the negative electrode 22 may be wound or folded together, and then be encased in a battery case 25. An electrolyte according to any of the above-described embodiments may be injected into the battery case 25, and then the battery case 25 may be sealed with a cap assembly member 26, thereby manufacturing the lithium battery 30. The battery case 25 may be a cylindrical case, a rectangular case, or a thin-filmed case. The lithium battery 30 may be a lithium ion battery.

The positive electrode 23 may include a positive electrode current collector, and a positive active material layer disposed on the positive electrode current collector.

The positive electrode current collector may have a thickness of about 3 μm to about 500 μm. The positive electrode current collector is not particularly limited, and may be any suitable material so long as it has a suitable conductivity without causing unsuitable or undesirable chemical changes in the fabricated battery. Examples of the positive electrode current collector include copper, stainless steel, aluminum, nickel, titanium, sintered carbon, copper or stainless steel that is surface-treated with carbon, nickel, titanium or silver, and aluminum-cadmium alloys. In addition, the positive electrode current collector may be processed to have fine irregularities on surfaces thereof so as to enhance adhesive strength of the positive electrode current collector to the positive active material, and may be used in any of various suitable forms including films, sheets, foils, nets, porous structures, foams, and non-woven fabrics.

The positive active material layer may include a positive active material, a binder, and, optionally, a conducting agent.

Any suitable lithium-containing metal oxide that is available in the art may be used as the positive active material. The positive active material may be at least one selected from a composite oxide of lithium with a metal selected from among Co, Mn, Ni, and a combination thereof. For example, the positive active material may be at least one selected from compounds represented by the following formula: Li$_a$A$_{1-b}$B$_b$D$_2$ (where 0.90≤a≤1, and 0≤b≤0.5); Li$_a$E$_{1-b}$B$_b$O$_{2-c}$D$_c$ (where 0.90≤a≤1, 0≤b≤0.5, and 0≤c≤0.05); LiE$_{2-b}$B$_b$O$_{4-c}$D$_c$ (where 0≤b≤0.5, and 0≤c≤0.05); Li$_a$Ni$_{1-b-c}$Co$_b$B$_c$D$_\alpha$ (where 0.90≤a≤1, 0≤b≤0.5, 0≤c≤0.05, and 0<α≤2); Li$_a$Ni$_{1-b-c}$Co$_b$B$_c$O$_{2-\alpha}$F$_\alpha$ (where 0.90≤a≤1, 0≤b≤0.5, 0≤c≤0.05, and 0<α<2); Li$_a$Ni$_{1-b-c}$Co$_b$B$_c$O$_{2-\alpha}$F$_2$ (where 0.90≤a≤1, 0≤b≤0.5, 0≤c≤0.05, and 0<α<2); Li$_a$Ni$_{1-b-c}$Mn$_b$B$_c$D$_\alpha$ (where 0.90≤a≤1, 0≤b≤0.5, 0≤c≤0.05, and 0<α≤2); Li$_a$Ni$_{1-b-c}$Mn$_b$B$_c$O$_{2-\alpha}$F$_\alpha$ (where 0.90≤a≤1, 0≤b≤0.5, 0≤c≤0.05, and 0<α<2); Li$_a$Ni$_{1-b-c}$Mn$_b$B$_c$O$_{2-\alpha}$F$_2$ (where 0.90≤a≤1, 0≤b≤0.5, 0≤c≤0.05, and 0<α<2); Li$_a$Ni$_b$E$_c$G$_d$O$_2$ (where 0.90≤a≤1, 0≤b≤0.9, 0≤c≤0.5, and 0.001≤d≤0.1); Li$_a$Ni$_b$Co$_c$Mn$_d$G$_e$O$_2$ (where 0.90≤a≤1, 0≤b≤0.9, 0≤c≤0.5, 0≤d≤0.5, and 0.001≤e≤0.1); Li$_a$NiG$_b$O$_2$ (where 0.90≤a≤1, and 0.001≤b≤0.1); Li$_a$CoG$_b$O$_2$ (where 0.90≤a≤1, and 0.001≤b≤0.1); Li$_a$MnG$_b$O$_2$ (where 0.90≤a≤1, and 0.001≤b≤0.1); Li$_a$Mn$_2$G$_b$O$_4$ (where 0.90≤a≤1, and 0.001≤b≤0.1); QO$_2$; QS$_2$; LiQS$_2$; V$_2$O$_5$; LiV$_2$O$_5$; LiIO$_2$; LiNiVO$_4$; Li$_{(3-f)}$J$_2$(PO$_4$)$_3$ (where 0≤f≤2); Li$_{(3-f)}$Fe$_2$(PO$_4$)$_3$ (where 0≤f≤2); LiFePO$_4$.

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

In some embodiments, the positive active material may be $LiCoO_2$, $LiMn_xO_{2x}$ (wherein x=1, 2), $LiNi_{1-x}Mn_xO_{2x}$ (wherein 0<x<1), $LiNi_{1-x-y}Co_xMn_yO_2$ (0≤x≤0.5, 0≤y≤0.5), or $FePO_4$.

The compounds listed above as positive active materials may have a surface coating layer (hereinafter, "coating layer"). Alternatively, or additionally, a mixture of a compound without a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using a compound of these coating elements by any suitable method that does not adversely affect the physical properties of the positive active material. For example, the coating layer may be formed using a spray coating method, a dipping method, or any other suitable method available to one of ordinary skill in the art. Thus, further description thereof will not be provided here.

The binder may strongly bind positive active material particles together and to a current collector. Examples of the binder include, but not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), acrylated SBR, epoxy resin, and nylon.

The conducting agent may be used to provide conductivity to electrodes. Any suitable electron conducting material that does not induce unsuitable or undesirable chemical change in batteries may be used. Examples of the conducting agent include natural graphite, artificial graphite, carbon black (e.g., acetylene black, and/or ketjen black), carbon fibers, and metallic materials, including copper, nickel, aluminum, and silver, in powder or fiber form. The conducting agent may include a single conductive material, such as a polyphenylene derivative, or a combination of at least two conductive materials.

The negative electrode 22 may include a negative electrode current collector and a negative active material layer disposed on the negative electrode current collector.

The negative electrode current collector may have, for example, a thickness of about 3 μm to about 500 μm. The negative electrode current collector is not particularly limited, and may be any suitable material so long as it has a suitable conductivity without causing unsuitable or undesirable chemical changes in the fabricated battery. Examples of the negative electrode current collector include copper, stainless steel, aluminum, nickel, titanium, sintered carbon, copper or stainless steel that is surface-treated with carbon, nickel, titanium or silver, and aluminum-cadmium alloys. In addition, the negative electrode current collector may be processed to have fine irregularities on surfaces thereof so as to enhance adhesive strength of the negative electrode current collector to the negative active material, and may be used in any of various suitable forms including films, sheets, foils, nets, porous structures, foams, and non-woven fabrics.

The negative active material layer may include a negative active material, a binder, and, optionally, a conducting agent.

The negative active material is not particularly limited, and may be selected from any suitable negative active material available in the art. Non-limiting examples of the negative active material include lithium metal, a metal that is alloyable with lithium, a transition metal oxide, a material that allows doping or undoping of lithium, and a material that allows reversible intercalation and deintercalation of lithium ions, which may be used as a mixture or in combination of at least two thereof.

The lithium metal alloy may be an alloy of lithium with a metal selected from the group consisting of sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

Non-limiting examples of the transition metal oxide include a tungsten oxide, a molybdenum oxide, a titanium oxide, a lithium titanium oxide, a vanadium oxide, and a lithium vanadium oxide.

Examples of the material that allows doping or undoping of lithium therein include Si, Sn, Al, Ge, Pb, Bi, Sb, $SiO_x$ (wherein 0<x<2) and a Si—Y alloy (wherein Y is an alkali metal, an alkali earth metal, a Group 11 element, a Group 12 element, a Group 13 element, a Group 14 element, a Group 15 element, a Group 16 element, a transition metal, a rare earth element, and a combination thereof except for Sn. For example, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

The material that allows reversible intercalation and deintercalation of lithium ions may include any suitable carbonaceous negative active materials that are available in the art for use with lithium batteries. Examples of such carbonaceous materials include crystalline carbon, amorphous carbon, or mixtures thereof. Non-limiting examples of the crystalline carbon include natural graphite, artificial graphite, expanded graphite, graphene, fullerene soot, carbon nanotubes, and carbon fiber. Non-limiting examples of the amorphous carbon include soft carbon (carbon sintered at low temperatures), hard carbon, meso-phase pitch carbides, and sintered corks. The carbonaceous negative active material may be in, for example, spherical, planar, fibrous, tubular, or powder form.

In some embodiments, the negative active material may include a silicon-based negative active material selected from, for example, Si, $SiO_x$ (wherein $0<x<2$), a Si—Z alloy (wherein Z is an alkali metal, an alkali earth metal, a Group 13 element, a Group 14 element, a Group 15 element, a Group 16 element, a transition metal, a rare earth element, or combinations thereof (except for Si)), and combinations thereof. Z may be selected from the group consisting of Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof. These silicon-based negative active compounds, such as Si, $SiO_x$, a Si—Z alloy, and the like may substantially have a crystalline form (e.g., a monocrystal or polycrystal form), an amorphous form, or a combination thereof.

The binder may strongly bind negative active material particles together and to the negative electrode current collector. Non-limiting examples of the binder include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent may be used to provide conductivity to the negative electrode. Any suitable electron conducting material that does not induce unsuitable or undesirable chemical change in batteries may be used. Examples of the conducting agent include carbonaceous materials, such as natural graphite, artificial graphite, carbon black (e.g., acetylene black and/or ketjen black), carbon fibers, and the like; metal-based materials, such as copper (Cu), nickel (Ni), aluminum (Al), silver (Ag), and the like, in powder or fiber form; and conductive materials, including conductive polymers, such as a polyphenylene derivative, and mixtures thereof.

The negative electrode 22 and the positive electrode 23 may be each formed by mixing an active material, a conducting agent, and a binder in a solvent to prepare an active material composition, and then coating the active material composition on a current collector. The method of manufacturing electrodes may include any suitable method available to one of ordinary skill in the art. Thus, further description thereof will not be provided here. Non-limiting examples of the solvent include N-methylpyrrolidone ("NMP"), acetone, and water.

The negative electrode 22 and the positive electrode 23 may be separated from each other by the separator 24. The separator 24 may be any suitable separator that is available for use with lithium batteries. For example, a suitable separator may have low resistance to migration of ions in an electrolyte and have high electrolyte-retaining ability. The separator 24 may be a single layer or a multi-layer. Exemplary materials of the separator 24 include glass fiber, polyester, Teflon, polyethylene, polypropylene, polytetrafluoroethylene (PTFE), and a combination thereof, each of which may be a nonwoven fabric or a woven fabric. The separator 24 may have a pore diameter of about 0.01 μm to about 10 μm and a thickness of about 3 μm to about 100 μm.

The electrolyte of the lithium battery 30 may include lithium difluorophosphate ($LiPO_2F_2$), a sultam-based compound, and an organic solvent as described above. The electrolyte may be injected between the negative electrode 22 and the positive electrode 23 that are separated by the separator 24.

A negative electrode coating layer including a reaction product of the electrolyte may be on a surface of the negative electrode. The reaction product of the electrolyte may include at least one selected from compounds represented by Formulae 3 and 4.

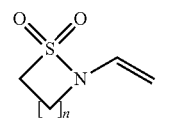

Formula 3

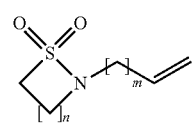

Formula 4

In Formulae 3 and 4, n may be from 1 to 4, and m may be from 1 to 10.

The negative electrode coating layer, including a reaction product of the electrolyte, may be a solid electrolyte interphase (SEI) layer that does not undergo denaturation under high-temperature (e.g., 60° C. or more) storage conditions and may remain durable with improved stability even after charging and discharging for a long time.

In some embodiments, the lithium battery may be suitable for use in mobile phones, portable computers, and devices that use or require high-voltage, high-power, and high-temperature operation conditions, such as electric vehicles. For example, the lithium battery may also be used in hybrid vehicles in connection with internal combustion engines, fuel cells, super capacitors, and/or the like, and in any devices that use or require high-power, high-voltage, and high-temperature operation conditions, such as electric bikes, power tools, and/or the like.

Substituents in the formulae described herein may be defined as follows.

As used herein, the term "alkyl" indicates a completely saturated, branched or unbranched (e.g., a straight or linear) hydrocarbon.

Non-limiting examples of the "alkyl" group include methyl, ethyl, n-propyl, isopropyl, n-butyl, isobutyl, sec-butyl, t-butyl, isopentyl, neopentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C30 alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C20 alkyl group, a C2-C30 alkenyl group, a C2-C30 alkynyl group, a C1-C20 heteroalkyl group, a C6-C30 aryl group, a C6-C30 arylalkyl group, a C1-C30 heteroaryl group, a C7-C30 heteroarylalkyl group, a C6-C30 heteroaryloxyl group, a C6-C30 heteroaryloxyalkyl group, or a C6-C30 heteroarylalkyl group.

As used herein, the term "halogen atom" indicates fluorine, bromine, chloride, iodine, and the like.

As used herein, the term "C1-C20 alkyl group substituted with a halogen atom" indicates a C1-C20 alkyl group substituted with at least one halo group (e.g., a group including a halogen atom). Non-limiting examples of the C1-C20 alkyl group substituted with a halogen atom include polyhaloalkyls including monohaloalkyl, dihaloalkyl, or perhaloalkyl.

As used herein, the term "monohaloalkyl" indicates an alkyl group including one iodine, bromine, chloride or fluoride. As used herein, the terms "dihaloalkyl" and "polyhaloalkyl" indicate alkyl groups including at least two identical or different halo atoms.

As used herein, the term "alkoxy" represents "alkyl-O—", wherein the alkyl is the same as described above. Non-limiting examples of the alkoxy group include methoxy, ethoxy, propoxy, 2-propoxy, butoxy, t-butoxy, pentyloxy, hexyloxy, cyclopropoxy, and cyclohexyloxy. At least one hydrogen atom of the alkoxy group may be substituted with the same substituents as those recited above in conjunction with the alkyl group.

As used herein, the term "alkoxyalkyl" indicates an alkyl group with substituents that are the same as those recited above in conjunction with the alkoxy group. At least one hydrogen atom of the alkoxyalkyl group may be substituted with substituents that are the same as those recited above in conjunction with the alkyl group. As defined above, the term "alkoxyalkyl" encompasses substituted alkoxyalkyl moieties.

As used herein, the term "alkenyl" indicates a branched or unbranched hydrocarbon having at least one carbon-carbon double bond. Non-limiting examples of the alkenyl group include a vinyl group, an aryl group, a butenyl group, an isopropenyl group, and an isobutenyl group. At least one hydrogen atom in the alkenyl group may be substituted with substituents that are the same as those recited above in conjunction with the alkyl group.

As used herein, the term "alkynyl" indicated a branched or unbranched hydrocarbon having at least one carbon-carbon triple bond. Non-limiting examples of the "alkynyl" group include ethynyl, butynyl, isobutynyl, and isopropynyl. At least one hydrogen atom of the "alkynyl" group may be substituted with substituents that are the same as those recited above in conjunction with the alkyl group.

As used herein, the term "aryl" group, which is used alone or in combination with other terms, indicates an aromatic hydrocarbon containing at least one ring. The term "aryl" is construed as including a group with an aromatic ring fused to at least one cycloalkyl ring. Non-limiting examples of the "aryl" group include phenyl, naphthyl, and tetrahydronaphthyl. At least one hydrogen atom of the "aryl" group may be substituted with substituents that are the same as those recited above in conjunction with the alkyl group.

The term "arylalkyl" indicates an alkyl group substituted with an aryl group. Examples of the "arylalkyl" group include benzyl and phenyl-$CH_2CH_2$—.

As used herein, the term "aryloxy" indicates "—O-aryl". An example of the aryloxy group is phenoxy. At least one hydrogen atom of the "aryloxy" group may be substituted with substituents that are the same as those recited above in conjunction with the alkyl group.

As used herein, the term "heteroaryl group" indicates a monocyclic or bicyclic organic compound including at least one heteroatom selected from among nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various suitable oxidized forms.

At least one hydrogen atom of the heteroaryl group may be substituted with the same substituents as those recited above in conjunction with the alkyl group.

As used herein, the term "heteroarylalkyl" group indicates an alkyl group substituted with a heteroaryl group.

As used herein, the term "heteroaryloxy" group indicates a "—O-heteroaryl moiety". At least one hydrogen atom of the heteroaryloxy group may be substituted, with the same substituents as those recited above in conjunction with the alkyl group.

The term "heteroaryloxyalkyl" group indicates an alkyl group substituted with a heteroaryloxy group. At least one hydrogen atom of the heteroaryloxyalkyl group may be substituted with the same substituents as those recited above in conjunction with the alkyl group.

As used herein, the term "carbocyclic" group indicates a saturated or partially unsaturated non-aromatic monocyclic, bicyclic or tricyclic hydrocarbon group. Non-limiting examples of the monocylic hydrocarbon group include a cyclopentyl group, a cyclopentenyl group, a cyclohexyl group, and a cyclohexenyl group. Non-limiting examples of the bicyclic hydrocarbon group include a bornyl group, a decahydronaphthyl group, a bicyclo[2.1.1]hexyl group, a bicyclo[2.2.1]heptyl group, a bicyclo[2.2.1]heptenyl group, and a bicyclo[2.2.2]octyl group. An example of the tricyclic hydrocarbon group is an adamantyl group. At least one hydrogen atom of the "carbocyclic group" may be substituted with substituents that are the same as those recited above in conjunction with the alkyl group.

As used herein, the term "heterocyclic group" indicates a five- to ten-membered ring including a heteroatom such as N, S, P, or O. An example of the heterocyclic group is pyridyl. At least one hydrogen atom in the heterocyclic group may be substituted with substituents that are the same as those recited above in conjunction with the alkyl group.

As used herein, the term "heterocyclic oxy" indicates an "—O-hetero ring". At least one hydrogen atom of the heterocyclic oxy group may be substituted with the same substituents as those recited above in conjunction with the alkyl group.

As used herein, the term "sulfonyl" indicates R"—$SO_2$—, where R" is a hydrogen atom, an alkyl group, an aryl group, a heteroaryl group, an aryl-alkyl group, a heteroaryl-alkyl group, an alkoxy group, an aryloxy group, a cycloalkyl group, or a heterocyclic group.

As used herein, the term "sulfamoyl" group refers to $H_2NS(O_2)$—, alkyl-$NHS(O_2)$—, $(alkyl)_2NS(O_2)$-aryl-NHS$(O_2)$—, alkyl-(aryl)-$NS(O_2)$—, $(aryl)_2NS(O)_2$, heteroaryl-$NHS(O_2)$—, (aryl-alkyl)-$NHS(O_2)$—, or (heteroaryl-alkyl)-$NHS(O_2)$—. At least one hydrogen atom of the sulfamoyl group may be substituted with the same substituents as those described above in conjunction with the alkyl group.

As used herein, the term "amino group" indicates a group with a nitrogen atom covalently bonded to at least one carbon or hetero atom. The amino group may refer to, for example, —$NH_2$ and substituted moieties. As used herein, the term "amino group" also refers to an "alkylamino group" having nitrogen bound to at least one additional alkyl group, and refers to an "arylamino group" and/or an "diarylamino group" each having at least one or two nitrogen atoms bound to a selected aryl group.

As used herein, the terms "alkylene", "arylene", and "heteroarylene" groups refer to divalent groups derived from alkyl, aryl, and heteroaryl groups, respectively.

One or more embodiments of the present disclosure will now be described in more detail with reference to the following examples. However, these examples are only for illustrative purposes and are not intended to limit the scope of the one or more embodiments of the present disclosure.

EXAMPLE 1

1.5M LiPF$_6$ was added to a mixed solvent of ethylene carbonate (EC), ethylmethyl carbonate (EMC), and dimethyl carbonate (DMC) to a volume ratio of about 20:10:70, and then 1 wt % of LiPO$_2$F$_2$ and 1 wt % of a compound represented by Formula 2a were added thereto to prepare an electrolyte.

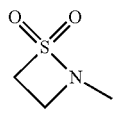

Formula 2a

To evaluate the electrolyte, an 18650-type (an 18650 kind of) circular full cell was manufactured using the electrolyte as follows.

LiNi$_{1/3}$Co$_{1/3}$Mn$_{1/3}$O$_2$ powder as a positive active material, a carbon conducting agent (Super-P; Timcal Ltd.), and polyvinylidene fluoride (PVDF) as a binder were mixed to a weight ratio of about 90:5:5, and then N-methylpyrrolidone (NMP) as a solvent was added to adjust the viscosity of the mixture until the solid content reached about 60 wt %, thereby preparing a positive electrode slurry. This positive electrode slurry was coated on an aluminum foil current collector having a thickness of about 15 μm to a thickness of about 40 μm, dried at room temperature and then at about 120° C., and then roll-pressed, thereby manufacturing a positive electrode.

Artificial graphite as a negative active material, a styrene-butadiene rubber, and carboxymethyl cellulose were mixed to a weight ratio of about 90:5:5, and then N-methylpyrrolidone as a solvent was added to adjust the viscosity of the mixture until the solid content reached about 60 wt %, thereby preparing a negative electrode slurry. This negative electrode slurry was coated on a copper foil current collector having a thickness of about 10 μm to a thickness of about 40 μm, dried at room temperature and then at about 120° C., and then roll-pressed, thereby manufacturing a negative electrode.

A polyethylene (PE) separator (Celgard PE 20-micron separator) and an electrolyte according to an embodiment as described above were used together with the positive electrode and the negative electrode to manufacture an 18650-type (an 18650 kind of) circular full cell.

Comparative Example 1

An 18650-type (an 18650 kind of) circular full cell was manufactured in the same manner as described with respect to Example 1, except that neither LiPO$_2$F$_2$ nor the compound of Formula 2a was added to the electrolyte.

Comparative Example 2

An 18650-type (an 18650 kind of) circular full cell was manufactured in the same manner as described with respect to Example 1, except that only 1 wt % of LiPO$_2$F$_2$ was added only to the electrolyte (the electrolyte of Comparative Example 2 was the same as the electrolyte of Example 1, except that the electrolyte of Comparative 2 did not include the compound represented by Formula 2a).

Comparative Example 3

An 18650-type (an 18650 kind of) circular full cell was manufactured in the same manner as described with respect to Example 1, except that 1 wt % of the compound represented by Formula 2a was added only to the electrolyte (the electrolyte of Comparative Example 3 was the same as the electrolyte of Example 1, except that the electrolyte of Comparative 3 did not include LiPO$_2$F$_2$).

Comparative Example 4

An 18650-type (an 18650 kind of) circular full cell was manufactured in the same manner as described with respect to Example 1, except that 1.5 wt % of the compound represented by Formula 2a was added only to the electrolyte (the electrolyte of Comparative Example 4 was the same as the electrolyte of Example 1, except that the electrolyte of Comparative 4 included 1.5 wt %, instead of 1 wt %, of the compound represented by Formula 2a, and the electrolyte of Comparative Example 4 did not include LiPO$_2$F$_2$).

Evaluation Example 1: Evaluation of Capacity Recovery After Storage at High Temperature (60° C.)

Each of the circular full cells of Example 1 and Comparative Examples 1 to 4 was charged at a constant current of 0.1 C rate at about 25° C. until a voltage of the circular full cell reached about 4.30 V (with respect to Li), and then switched to a constant voltage mode of about 4.30 V at a cut-off current of about 0.05 C rate, followed by discharging at a constant current of about 0.1 C rate to a voltage of about 2.8 V (with respect to Li) (Formation process, 1$^{st}$ cycle).

The circular full cell that passed through the 1$^{st}$ cycle of the formation process was charged at a constant current of about 0.2 C rate at about 25° C. until a voltage of the circular full cell reached about 4.30 V (with respect to Li), and then switched to a constant voltage mode of about 4.30 V at a cut-off current of about 0.05 C rate, followed by discharging at a constant current of about 0.2 C rate to a voltage of about 2.8 V (with respect to Li) (Formation process, 2$^{nd}$ cycle).

The circular full cell that passed through the 2$^{nd}$ cycle of the formation process was charged at a constant current of about 1.0 C rate at about 25° C. to a voltage of about 4.30 V (with respect to Li), and then switched to a constant voltage mode of about 4.30 V at a cut-off current of about 0.05 C rate to reach a 100% state-of-charge (SOC) fully charged at about 4.3 V.

The fully-charged circular full cells were stored in an oven at about 60° C. for 10 days or 30 days. After being taken out of the oven, each of the circular full cells was discharged at a current of about 0.1 C to a voltage of about 2.8 V.

The results of measuring capacity retention rates after the storage for 10 days or 30 days are shown in Table 1.

A capacity retention rate after storage at high temperature with respect to storage time is defined by Equation 1.

Capacity retention rate=[Discharge capacity after storage for 10 days or 30 days/Initial discharge capacity before storage at high temperature]× 100    Equation 1

TABLE 1

| | Discharge capacity (mAh) | | | Capacity retention rate (%) | | |
|---|---|---|---|---|---|---|
| Example | Initial | 10 days | 30 days | Initial | 10 days | 30 days |
| Example 1 | 3216 | 3019 | 3015 | 100 | 93.9 | 93.7 |
| Comparative Example 1 | 3215 | 3026 | 3021 | 100 | 94.1 | 93.9 |
| Comparative Example 2 | 3216 | 3023 | 3019 | 100 | 94.0 | 93.8 |
| Comparative Example 3 | 3206 | 3028 | 3025 | 100 | 94.4 | 94.3 |
| Comparative Example 4 | 3210 | 3005 | 3001 | 100 | 93.6 | 93.4 |

Referring to Table 1, the 18650-type (the 18650 kind of) circular full cell of Example 1 was found to have a similar or smaller change in capacity, compared to the 18650-type (the 18650 kind of) circular full cell of Comparative Example 1 including no additive and the 18650-type (the 18650 kind of) circular full cells of Comparative Examples 2 to 4 including only one of the additives.

Evaluation Example 2: Evaluation of Direct Current Internal Resistance (DCIR) After Storage at High Temperature (60° C.)

Direct current internal resistances (DCIRs) of the 18650-type (the 18650 kind of) circular full cells of Example 1 and Comparative Examples 1 to 4 were measured at room temperature (about 25° C.) before storage in a 60° C.-oven and after storage in a 60° C.-oven for about 30 days, according to the following method.

In the $1^{st}$ cycle, each cell was charged at a current of about 0.5 C to a voltage corresponding to a 50% SOC, cut off at about 0.02 C, and then allowed to rest for about 10 minutes, discharged at a constant current of about 0.5 C for about 30 seconds, rested for about 30 seconds, charged at a constant current of about 0.5 C for 30 seconds, and rested for about 10 minutes, discharged at a constant current of about 1.0 C for about 30 seconds, rested for about 30 seconds, charged at a constant current of about 0.5 C for about 1 minutes, and rested for about 10 minutes, discharged at a constant current of about 2.0 C for about 30 seconds, rested for about 30 seconds, charged at a constant current of about 0.5 C for about 2 minutes, and rested for about 10 minutes, and discharged at a constant current of about 3.0 C for about 30 seconds, rested for about 30 seconds, charged at a constant current of about 0.5 C for about 2 minutes, and rested for about 10 minutes.

An average of the voltage decrease for 30 seconds at each C-rate is defined as a direct current internal resistance value.

Figure 2:
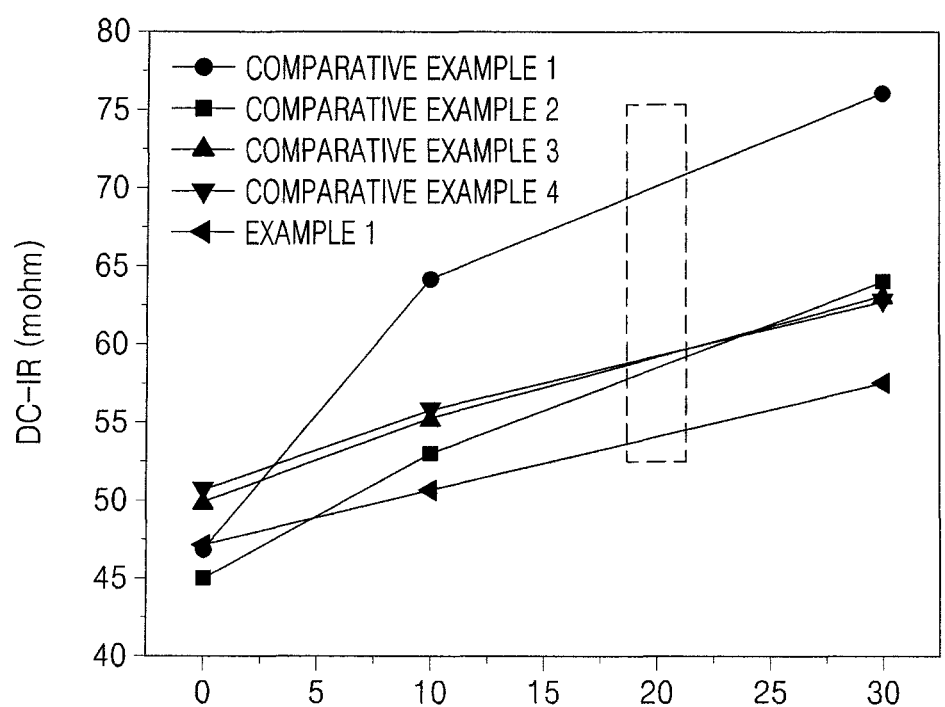
FIG. 2 is a graph illustrating the results of evaluating direct current internal resistance (DCIRs) of circular full cells manufactured in Example 1 and Comparative Examples 1 to 4 after storage at high temperature.

The DCIRs of the 18650-type (the 18650 kind of) circular full cells measured before storage (initial stage) and after storage for 10 days and 30 days are shown in FIG. 2 and Table 2. Resistance increase rates of the 18650-type (the 18650 kind of) circular full cells after storage at high temperature with respect to storage times were calculated using Equation 2. The calculated resistance increase rates are shown in Table 2.

Resistance increase rate=[(DCIR after storage at high temperature−Initial DCIR before storage at high temperature)/Initial DCIR before storage at high temperature]×100    Equation 2

TABLE 2

| | Resistance (mΩ) | | | Resistance increase rate (%) | | |
|---|---|---|---|---|---|---|
| Example | Initial | 10 days | 30 days | Initial | 10 days | 30 days |
| Example 1 | 47.0 | 50.6 | 57.3 | 0 | 8% | 22% |
| Comparative Example 1 | 46.8 | 64.1 | 76.0 | 0 | 37% | 62% |
| Comparative Example 2 | 44.9 | 53.0 | 64.0 | 0 | 18% | 42% |
| Comparative Example 3 | 49.7 | 55.1 | 62.7 | 0 | 11% | 26% |
| Comparative Example 4 | 50.9 | 56.0 | 63.0 | 0 | 10% | 24% |

Referring to FIG. 2 and Table 2, the 18650-type (the 18650 kind of) circular full cell of Example 1 was found to have a reduced DCIR increase rate after storage at high temperature, compared to the 18650-type (the 18650 kind of) circular full cell of Comparative Example 1 including no additive and the 18650-type (the 18650 kind of) circular full cells of Comparative Examples 2 to 4 including only one of the additives.

As shown in the above-described evaluation examples, an electrolyte according to an embodiment of the present disclosure is found to improve the high-temperature (e.g., 60° C. or more) stability of a lithium battery.

As described above, according to the one or more embodiments, an electrolyte according to any of the above-described embodiments may reduce an internal resistance increase rate of a lithium battery at high temperature (e.g., 60° C. or more), and thus improve lifetime characteristics of the lithium battery.

In the context of the present description, it will be understood that when an element or layer is referred to as being "on" another element or layer, it can be directly on the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present disclosure as defined by the following claims, and equivalents thereof.

What is claimed is:

1. An electrolyte comprising:
   a lithium difluorophosphate ($LiPO_2F_2$);
   a first compound represented by Formula 1; and
   an organic solvent,

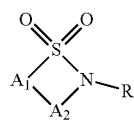

Formula 1 wherein, in Formula 1,
$A_1$ is carbon, oxygen, or nitrogen;
$A_2$ is an unsubstituted C1 to C10 alkylene group, or a substituted or unsubstituted C2 to C10 alkenylene group; and
R is a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 aryl alkyl group, a substituted or unsubstituted C1 to C10 hetero alkyl group, a substituted or unsubstituted C2 to C30 heterocyclic group, or a substituted or unsubstituted C1 to C30 heteroaryl group, and
wherein the electrolyte does not include a second compound represented by Formula 1 wherein $A_2$ is a substituted C1 to C10 alkylene group, $A_1$ is carbon, oxygen, or nitrogen, and R is a substituted or unsubstituted C1 to C30 alkyl group, a substituted or unsubstituted C2 to C30 alkenyl group, or a substituted or unsubstituted C2 to C30 alkynyl group, a substituted or unsubstituted C3 to C30 carbocyclic group, a substituted or unsubstituted C1 to C10 alkoxy group, a substituted or unsubstituted C6 to C30 aryl group, a substituted or unsubstituted C3 to C30 cycloalkenyl group, a substituted or unsubstituted C7 to C20 aryl alkyl group, a substituted or unsubstituted C1 to C10 hetero alkyl group, a substituted or unsubstituted C2 to C30 heterocyclic group, or a substituted or unsubstituted C1 to C30 heteroaryl group.

2. The electrolyte of claim 1, wherein the first compound comprises at least one selected from compounds represented by Formulae 5 and 6:

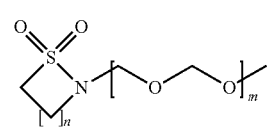

Formula 5

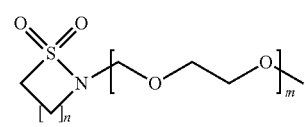

Formula 6 wherein, in Formulae 5 and 6, n is selected from 1 to 4, and m is selected from 1 to 10.

3. The electrolyte of claim 1, wherein the first compound comprises at least one selected from the following compounds:

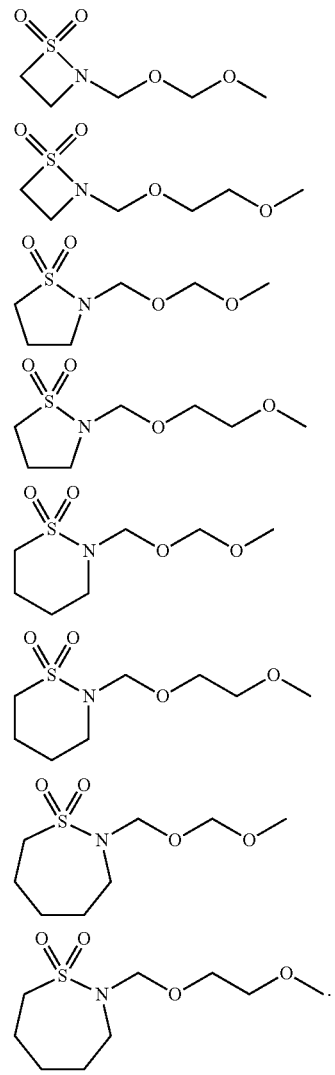

4. The electrolyte of claim 1, wherein the amount of the lithium difluorophosphate is about 0.01 wt % to about 5 wt % based on a total weight of the electrolyte.

5. The electrolyte of claim 1, wherein the amount of the first compound is about 0.01 wt % to 10 wt % based on a total weight of the electrolyte.

6. The electrolyte of claim 1, wherein the organic solvent comprises at least one selected from a carbonate solvent, an ester solvent, an ether solvent, a ketone solvent, an alcoholic solvent, and an aprotic solvent.

7. The electrolyte of claim 1, further comprising a lithium salt.

8. A lithium battery comprising;
a positive electrode;
a negative electrode; and
at least one selected from the electrolyte of claim 1 and a reaction product of the electrolyte between the positive electrode and the negative electrode.

9. The lithium battery of claim 8, wherein the reaction product of the electrolyte comprises at least one selected from compounds represented by Formulae 3 and 4:

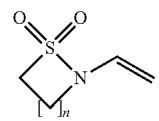

Formula 3

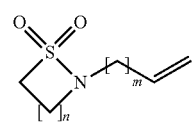

Formula 4 wherein, in Formulae 3 and 4, n is from 1 to 4, and m is from 1 to 10.

10. The lithium battery of claim 8, wherein the lithium battery has an operation voltage in a range of about 2.8V to about 4.6V.

11. A secondary battery comprising the electrolyte of claim 1.

* * * * *